July 29, 1969 W. K. BOICE 3,458,791
ADJUSTABLE SPEED DRIVE SYSTEM WITH FRICTION COMPENSATION
Filed Nov. 30, 1966 2 Sheets-Sheet 1

INVENTOR
WILLIAM K. BOICE
BY
Edward A. Goebel
HIS AGENT

United States Patent Office 3,458,791
Patented July 29, 1969

3,458,791
ADJUSTABLE SPEED DRIVE SYSTEM WITH
FRICTION COMPENSATION
William K. Boice, Erie, Pa., assignor to General Electric
Company, a corporation of New York
Filed Nov. 30, 1966, Ser. No. 597,967
Int. Cl. H02k 27/20
U.S. Cl. 318—327                                    8 Claims

ABSTRACT OF THE DISCLOSURE

The disclosure teaches a circuit which automatically compensates an adjustable speed drive system for torque resulting from discontinuous frictional forces. The circuit compensates the drive system by increasing the torque, produced by a drive motor, as a result of current which flows from a charged capacitor and current which continuously flows through an amplifier.

---

This invention relates to adjustable speed drive systems, and more specifically, to drive systems which start up from zero speed or change direction of rotation with little or no advance indication.

Many applications of adjustable speed drive systems, such as those used in servomechanisms for military use or for machine tools, require drive motors of the systems to start up or reverse their direction of rotation with little or no advance indication. When the motors begin to rotate, discontinuous frictional forces may occur between mechanical members of the drive system and between mechanical members of a load. These forces produce discontinuous torques which resist rotation in the desired direction. Some of these frictional forces cause stalling of the drive systems due to the discontinuities in their speed-torque characteristics and other transient disturbances which impair the performance of the systems.

It is an object of this invention to provide an adjustable speed drive system which automatically compensates for the effects of discontinuous frictional forces.

It is an other object of this invention to provide circuit means which allows an adjustable speed drive system to start up from standstill without having its performance impaired by the effects of discontinuous frictional forces.

It is still a further object of this invention to provide a circuit means which automatically compensates an adjustable speed drive system for discontinuous torques caused by frictional forces which occur when the system is changing its direction of rotation.

Briefly stated, and in accordance with one aspect of this invention, first means are provided for varying the torque (and thus the speed) and the direction of rotation of a drive motor in a conventional adjustable speed drive system. The first means responds to actuating signals from a regulator for the system. In this conventional drive system the regulator itself combines input signals, such as reference signals from a command source and feedback signals from a feedback network, to provide the actuating signals which control the motor.

Means responding to an appropriate input signal automatically supplement the error signals at start up in proportion to the effects of discontinuous frictional forces on the system. As a result, the first means changes the motor torque sufficiently to overcome a reverse torque produced by these discontinuous frictional forces at start up.

The following terms are intended to have the following meanings:

"Coulomb friction" means a frictional force which produces a discontinuous torque having a constant magnitude in a direction which opposes the rotation of a drive system.

"Stiction" means a frictional force producing a torque which opposes the direction of desired rotation of movable members in a drive system at start-up, but diminishes as a drive system breaks away from rest.

"Viscous friction" refers to a frictional force which produces a torque having a magnitude which is proportional to speed, in a direction which opposes the rotation of the movable members of the drive system.

The novel features believed to be characteristic of this invention are set forth with particularity in the appended claims. The organization and manner of operation of the invention, together with further objects and advantages thereof, may best be understood by reference to the following description, taken in conjunction with the accompanying drawings in which:

FIG. 1(a) is a circuit diagram showing an alternate form of FIG. 1;

Figure 1:
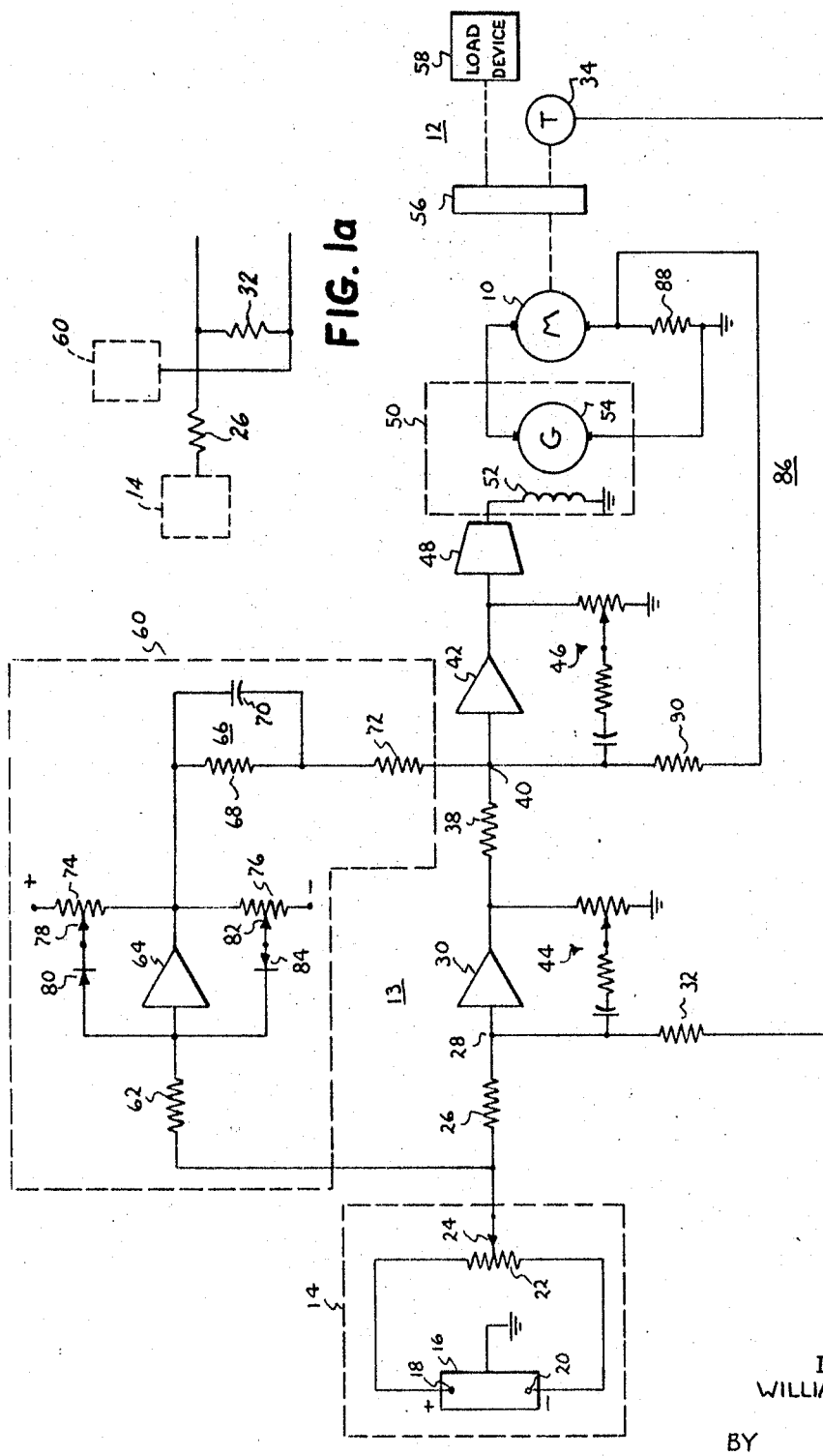
FIG. 1 is a circuit diagram showing one embodiment of an adjustable speed drive system embodying this invention.

FIG. 1 shows a conventional, adjustable speed drive system which is compensated for the effects of discontinuous frictional forces in accordance with this invention. In this system, a drive motor 10 rotates members of a load 12, in response to error signals provided by a regulator 13. In this illustrated embodiment, a command source 14 comprises a grounded power supply 16 having positive and negative polarity terminals 18 and 20, respectively, connected to opposite sides of a potentiometer 22. A potentiometer tap 24 can be adjusted either manually or by any convenient mechanism to vary the speed at which the motor 10 drives the load 12.

The command source 14 may comprise the power supply and potentiometer shown in FIG. 1, or it may comprise any convenient means for generating reference signals having a magnitude proportional to the desired speed of the drive motor 10. For example, it may include a tachometer generator which is driven by a master drive system. The command source may also include a computer or an acceleration timing circuit, with the analog output signals of either of these being the reference signals. The reference signals themselves may be reversible in polarity, as shown in FIG. 1, or they may have a single polarity.

The reference signals are coupled through a resistance 26 to a junction 28 at the input of an amplifier 30 in the regulator 13. Negative feedback signals, proportional to an operating characteristic of the load 12, are coupled through a resistance 32 to the junction 28. In the present embodiment the feedback signals are generated by a speed responsive, direct current tachometer generator 34. However, feedback signals may also be generated in response to apparatus which measures characteristics of the load 12 other than speed, such as the position of a load device, tension developed on a member of the load, or the torque developed by the motor 10.

The difference between the current flow through the resistance 26, caused by the reference signals, and the current flow through the resistance 32, caused by the feedback signals, produces an error signal at the junction 28. This error signal is amplified by the amplifier 30. The resulting actuating signal is fed through the resistance 38 to a junction 40 in the input circuit of an amplifier 42.

An adjustable feedback network 44 is connected across the amplifier 30. The network 44 responds to high frequency signals which occur due to transient operating conditions of the drive system, thereby stabilizing the system. A similar feedback network is coupled across the amplifier 42.

The amplifier 42 is connected through a power amplifier 48 to means 50, comprising a direct current generator in the illustrated embodiment, for controlling the torque (and as a result the speed) and the direction of rotation of the motor 10. The direct current generator comprises field windings 52 which are energized by the power amplifier 48, and armature windings 54 connected across the motor 10. While the present embodiment shows at direct current generator for controlling the motor speed, any other apparatus which can perform this function may be used. For example, if the motor 10 were an alternating current motor, an adjustable frequency source could comprise the means 50 for controlling the torque and the direction of rotation of the motor 10. Other alternatives to the direct current generator shown as 50 may include static control apparatus such as that type which uses controllable power rectifier devices or magnetic amplifiers.

The motor 10 is conveniently coupled through gears 56 to a load device 58 in the load 12. Another portion of the gears 56 may be used to enable the tachometer 34 to measure the speed of the motor 10.

Figure 2:
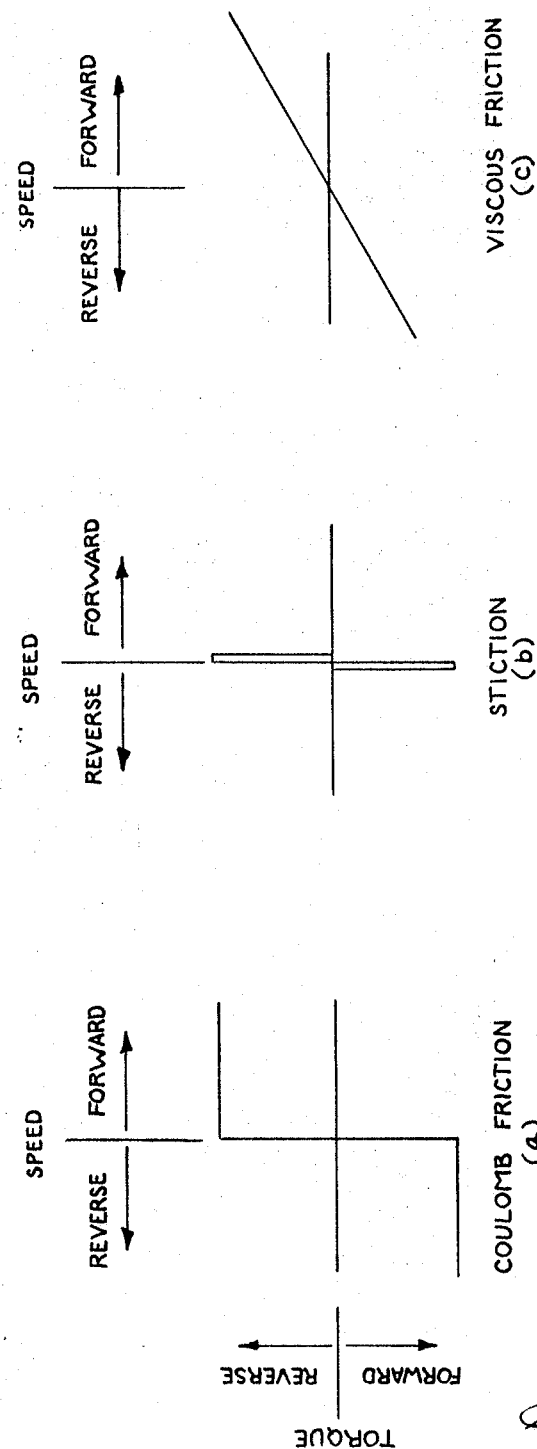
FIG. 2 shows graphical analyses of the effects of frictional forces which occur during the operation of drive systems.

FIG. 2 is a graphical analysis of the effects of the various types of frictional forces which can exist in a drive system having a particular load. For any change in the size of the load of a drive system, the magnitude of the torque may change, but the resultant torque can, nevertheless, s ill be resolved into components of the three types already described.

As a result of coulomb friction, a torque occurs which is constant at all speeds of the drive system. This torque opposes movement in the desired direction of rotation, as shown in FIG. 2(a). Stiction produces a torque opposing the direction of rotation for a short time as the drive system breaks away from its rest position. This torque decreases at a very low speed, as shown in FIG. 2(b). A torque which increases in magnitude with the speed is a result of viscous friction, as shown in FIG. 2(c).

In typical drive systems encountered in practice, resultant frictional torques comprise a combination of two or three of the types of torque shown in FIG. 2. While viscous frictional torque is seldom difficult to overcome, the discontinuous nature of the torque resulting from coulomb friction and stiction impose many transient disturbances on drive systems.

In order to compensate for the discontinuous torques provided by these frictional forces, this invention provides a circuit, generally shown as 60, for automatically supplementing the actuating signal magnitude as a result of an input signal to the regulator 13 so that the torque produced by the adjustable speed drive system increases as needed during start-up from a rest position or during a reversal of direction of the drive system. The circuit 60 includes means which, in response to input signals while the motor is rotating in any direction, provide a constant signal and a short duration signal to increase the motor torque. In the circuit 60, a resistance 62 couples reference signals to an amplifier 64 which amplifies and inverts the signal. The output of the amplifier 64 is coupled through a network comprising an R-C circuit 66, consisting of a resistance 68 and a capacitance 70, and a resistance 72. Current flow through the resistance 68 from the amplifier 64 helps to overcome the effects of coulomb friction. The capacitor 70 in the R-C circuit 66 temporarily increases the signal level at the junction 40, requiring a step-like increase in the motor torque which can overcome the effects of stitcion. The ratio between stiction compensation and coulomb friction compensation can be adjusted by changing the relative values of the resistances 68 and 72.

The magnitude of maximum friction compensation is controlled by adjusting potentiometers 74 and 76. The potentiometer 74, connected between a positive polarity power source and the output of amplifier 64, has its slide wire 78 connected to the cathode of a diode 80 and through this diode to the input of the amplifier 64. The potentiometer 76, connected between the negative polarity power supply and the output of the amplifier 64, has its slide wire 82 connected to the anode of a diode 84 and through this diode to the input of the amplifier 64. When the reference signals from the command source 14 are positive in polarity, their maximum effective magnitude is limited by the diode 80 and the potentiometer 74. When the signals are negative in polarity, their maximum magnitude is limited by the diode 84 and the potentiometer 76. For example, with a positive polarity reference signal, the diode 80 conducts when the output signals of the amplifier 64 reach such a level that the voltage at the slide wire 78 forward biases the diode 80. Thereafter, the current flow through diode 80 limits the output signal level of the amplifier 64. The magnitude of the friction compensation can be changed by adjusting the position of the slide wires 78 and 82. As an alternative, breakdown voltage devices, such as zener diodes, may be used to limit the output signals of the amplifier 64 in place of the diode-potentiometer combinations shown.

To aid in the generation of torque which overcomes the effects of discontinuous frictional forces, the amplifier 42 is used in combination with the current feedback circuit 86, which is connected between the motor 10 and a junction 40 at the input of the amplifier 42. This current feedback circuit includes a resistance 88 which conducts the armature current in the motor 10 and generates a signal proportional to this current. As a result of this signal, current is coupled through a resistance 90 so as to reduce the signal level at the junction 40 by an amount proportional to the motor current. Since the generated torque is proportional to the motor current, the negative feedback signals from the feedback circuit 86 reduce the signal level at the junction 40 in response to increases in the motor torque. Thus, in accordance with well known engineering practices, the feedback network 86 and the high gain amplifier 42 make the drive system responsive to the actuating signals and the friction compensating signals.

OPERATION

During the normal operation of the adjustable speed drive system shown in FIG. 1, signals from the command source 14 may require the drive motor 10 to start up from standstill or to reverse its direction of rotation. The difference between the magnitude of these signals and the magnitude of the feedback signals from the tachometer 34 provides error signals for the regulator 13.

The reference signals are amplified by the amplifier 64 and coupled to the junction 40 where they are added to the actuating signals from the amplifier 30. The sudden application of signals from the amplifier 64 causes a momentary current to flow through the capacitor 70 to the junction 40 to aid in overcoming the effects of stiction. The remaining portion of the current from the amplifier 64, flowing through the resistance 68, aids in overcoming the effects of coulomb friction on the drive system. The output signals from the amplifier 64 have a polarity which increases the motor torque in the same direction called for by the error signals from the amplifier 30.

As a result of the signals from the circuit 60, the power amplifier 48 increases the energization of the field windings 52 to increase the output voltage across the generator 54. As armature current in the motor 10 increases, so does the motor torque to overcome the effects of the discontinuous frictional forces. Signals through the feedback circuit 86 decrease the motor torque called for at the junction 40. As the generated motor torque increases and therefore overcomes the effects of discontinuous types of frictional forces, the torque called for at the junction 40 is decreased.

This invention is not limited to the specific details of the preferred embodiments shown, and it is contemplated that many changes, additions and modifications will be made in this embodiment to comply with the requirements of specific applications of this invention. For example, where the effects of stiction are not a problem, the capacitor 70 may be eliminated from the circuit. As another alternative a timing relay or relays may replace the capacitor 70 to provide the momentary current which acts to overcome the effects of stiction. Another possible modification comprises generating the automatic frictional torque compensating signals in response to feedback signals from the tachometer 34. This modification is shown in FIGURE 1(a). In this instance, resistance 62 would be disconnected from between the slide wire 24 and the resistance 26 and would be connected to the junction between the resistance 32 and the tachometer 34. Means would then be required to obtain the proper polarity of the compensating signal.

It is therefore intended that the appended claims cover all such changes, additions and modifications which fall within the true spirit and scope of this invention.

What I claim as new and desire to secure by Letters Patent of the United States is:

1. In an adjustable speed drive system including first means for controlling the torque (and thus the speed) and the direction of rotation of a drive member by applying electrical energy to the drive member, the first means responding to actuating signals coupled from a regulator which combines input signals, such as reference signals from a command source and feedback signals from a feedback network, to produce the actuating signals, a circuit for compensating the drive system for the effects of discontinuous frictional forces, comprising, in combination:

(a) second means comprising a current source coupled to the input of the regulator and responsive to one of the regulator input signals upon start up of the drive member from zero speed for immediately generating friction compensating signals having a single polarity during the rotation of the drive member in a single direction and having a level and duration proportional to the magnitude and duration, respectively, of torque produced by the discontinuous frictional forces which occur when the drive member starts up from zero speed; and (b) third means for connecting said second means in a parallel cricuit relationship with the regulator to couple friction compensating signals from said second means to a portion of an input circuit for the first means at which the polarity of the friction compensating signals can cause a change in the torque produced by the drive member in a direction which overcomes torque produced by the discontinuous frictional forces.

2. A circuit according to claim 1 wherein said second means is coupled to the command source so that said second means responds to the reference signals to automatically change the friction compensating signals in magnitude and/or polarity when the drive motor is required to start up from a complete stop or change its direction of rotation.

3. A circuit according to claim 1 wherein the first means comprises a direct current generator having field windings which can be energized by the actuating signals and the friction compensating signals and having armature windings which are connected to the armature of a direct current drive motor.

4. A circuit according to claim 1 which includes a current feedback network coupled between the armature circuit of the drive motor and the input circuit for the first means.

5. A circuit according to claim 1 wherein said second means includes means for generating signals of short duration in response to one of the regulator input signals at start up from zero speed to overcome the effects of stiction.

6. In an adjustable speed drive system which includes:
(a) a drive motor;

(b) electric generator means coupled to said motor to supply energy which determines the torque (and thus the speed) and the direction of rotation of said drive motor;

(c) a command source for providing reference signals proportional to the desired performance of said drive system;

(d) a feedback network for providing feedback signals proportional to the actual performance of said drive system;

(e) regulating means coupled to said command source and to said feedback network for combining input signals, comprising the reference signals and the feedback signals, to produce actuating signals; and means for coupling the actuating signals to an input circuit of said electric generator means; the improvement wherein said drive system also includes a circuit for compensating the drive system for torques produced by discontinuous frictional forces such as coulomb friction and stiction, said circuit omprising:

(f) first circuit means for providing first friction compensating signals having a constant maximum magnitude at all speeds in each direction of rotation of said drive motor and a single polarity for each direction of rotation which polarity changes with each change in the required direction of rotation so as to aid said drive system in overcoming torque caused by coulomb friction;

(g) second circuit means for providing second friction compensating signals each time said drive motor begins to rotate, the second compensating signals having a short duration and a single polarity such that they can aid said drive system in overcoming torque caused by stiction;

(h) means for coupling said first and second circuit means to said command source so that the first and second compensating signals are generated in response to the reference signals; and (i) means for coupling the friction compensating signals in a parallel circuit relationship with said regulator to an input circuit of said electric generator means to supplement the actuating signals with the friction compensating signals having a polarity which increases the required torque from said motor means.

7. A circuit according to claim 6 wherein said first and second circuit means include amplifier means for amplifying the reference signals, said amplifier means including diode means and potentiometer means connected between the input and the output of said amplifier means to limit the maximum level of said friction compensating signals.

8. In an adjustable speed drive system which includes first means for controlling the torque (and thus the speed) and the direction of rotation of the drive member by applying electrical energy to the drive member, a circuit for compensating the drive system for the effects of discontinuous frictional forces; comprising, in combination:

(a) second means coupled to the drive member for generating speed signals having a characteristic related to the speed of the drive member and regulating means coupled to said second means and responsive to the speed signals to produce error signals which vary as a function of the difference between the actual speed of the drive member and a desired speed of the drive member and means for coupling the error signals to said first means;

(b) third means, coupled to said second means, and responsive to the speed signals upon start up of the drive member from zero speed for generating friction compensating signals having a single polarity during the rotation of the drive member in a single direction and having a level and duration proportional to the magnitude and duration, respectively, of torque produced by the discontinuous frictional forces which first occur when the drive member starts up from zero speed, either when the drive member begins to rotate from standstill or when the drive member reverses its direction of rotation; and (c) fourth means for coupling the friction compensating signals from said third means in a parallel circuit relationship with the error signals to a portion of an input circuit for the first means at which the polarity of the friction compensating signals can cause a change in the torque produced by the drive member in a direction which overcomes the torque produced by the discontinuous frictional forces.

References Cited

UNITED STATES PATENTS

| 2,470,099 | 5/1949 | Hall | 318—20.435 |
| 2,496,391 | 2/1950 | Hall | 318—20.435 |
| 3,170,104 | 2/1965 | Richards et al. | 318—146 |
| 3,302,089 | 1/1967 | Rosa et al. | 318—356 |

ORIS L. RADER, Primary Examiner

K. L. CROSSON, Assistant Examiner

U.S. Cl. X.R.

318—146, 355, 431